Figure 1:
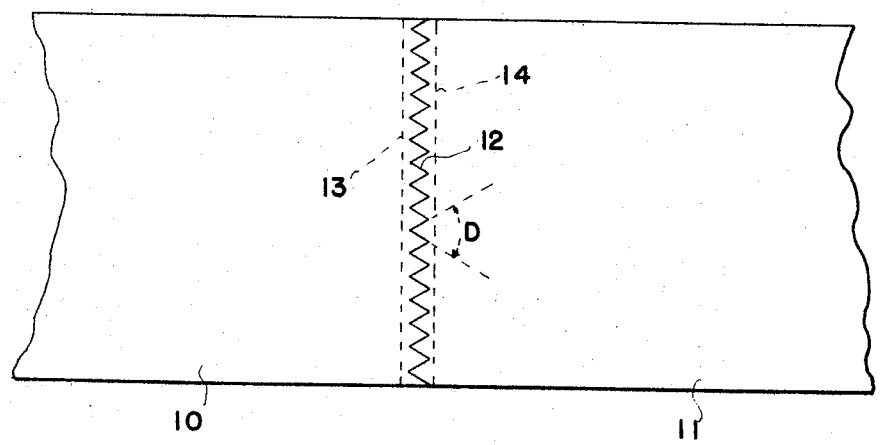

Jan. 31, 1967    M. M. SEELOFF    3,301,992
METHOD FOR JOINING FLAT METAL STOCK
Filed Aug. 14, 1963    2 Sheets-Sheet 1

INVENTOR.
MELVIN M. SEELOFF
BY
*Francis J. Klempay*
ATTORNEY

INVENTOR.
MELVIN M. SEELOFF
BY Francis J. Klempay
ATTORNEY

United States Patent Office 3,301,992
Patented Jan. 31, 1967

3,301,992
METHOD FOR JOINING FLAT METAL STOCK
Melvin M. Seeloff, Warren, Ohio, assignor to The Taylor-Winfield Corporation, Warren, Ohio, a corporation of Ohio
Filed Aug. 14, 1963, Ser. No. 302,015
10 Claims. (Cl. 219—105)

This invention relates to an improved method for the flat joining of metal strip or sheet in edge-to-edge or end-to-end relation, and may have application in the manufacture of thin-gauge continuous strip from discrete lengths thereof and in the production of sheet metal can bodies, for example. Many modern strip processing and/or utilization lines require a continuous unbroken supply of strip and they operate at high speed so that the problem of very rapidly and satisfactorily joining strip lengths in end-to-end relation becomes rather acute. In can making, high speed and fluid-tightness are important. Further, in many cases, the strip or sheet must be joined without extruded flash or any approciable increase in thickness at the joint over the thickness of the parent strip or sheet.

It is accordingly the primary object of the invention to provide an improved method for the flat joining of metal strip or sheet which is capable of effecting the joint in a very short period of time and which results in a homogeneous strong and fluid-tight joint lying wholly within the plane of the parent strip.

The above object is accomplished, in accordance with this invention, by first preparing the ends or edges of the strip pieces to be joined, with serrations which after being brought together in nesting relation are welded together by suitable resistance, induction or gas heating methods, as for example, being engaged on opposite sides by an electric resistance seam welding assembly which operates to weld the strip together along the edges of these serrations while crushing or ironing the serrations back down into the plane of the parent strip. The serrations are brought into nesting or interlocking relation by angularly relating the edge portions of the workpieces containing them. These edges of the serrations, being commonly rather sharp, provide excellent contact for the start of the welding cycle, the melting or fusion progressing rapidly as these serrations are bent from their initial parent strip. The result is that the weld is uniform and continuous along the zig-zag line of the joint, which line is barely discernible in the final product. The greater length of the effective weld line increases the strength of the joint and, as will appear below, the serrations facilitate the proper relative locating of the workpieces prior to joining.

The above and other objects and advantages of the invention will become apparent upon consideration of the following specification and the accompanying drawing wherein the principles of the invention are disclosed.

Figure 2:
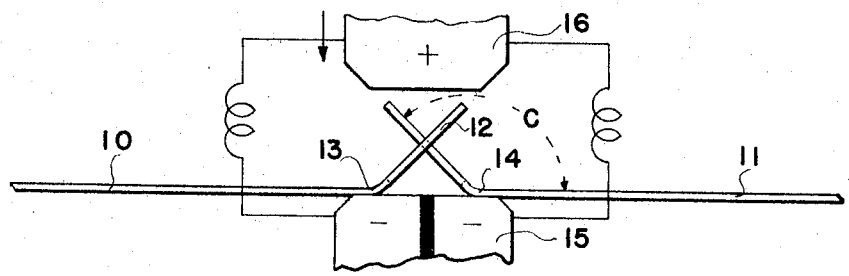
Figure 3:
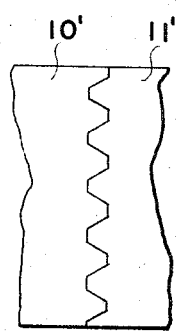
Figure 4:
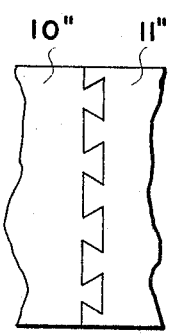
Figure 5:
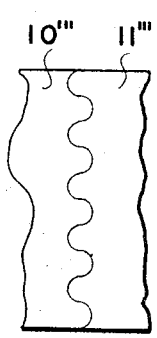
Figure 6:
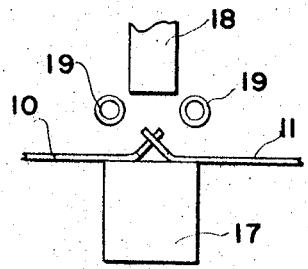
Figure 7:
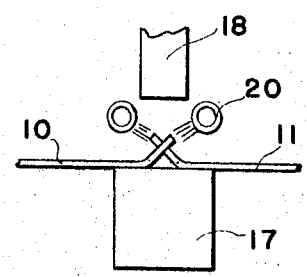
Figure 8:
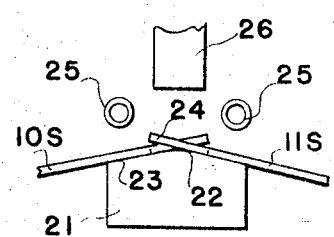
Figure 11:
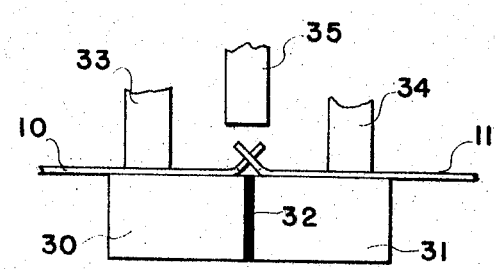
Figure 9:
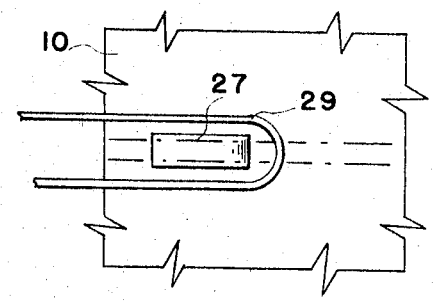
Figure 10:
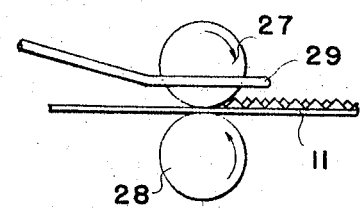
Figure 12:
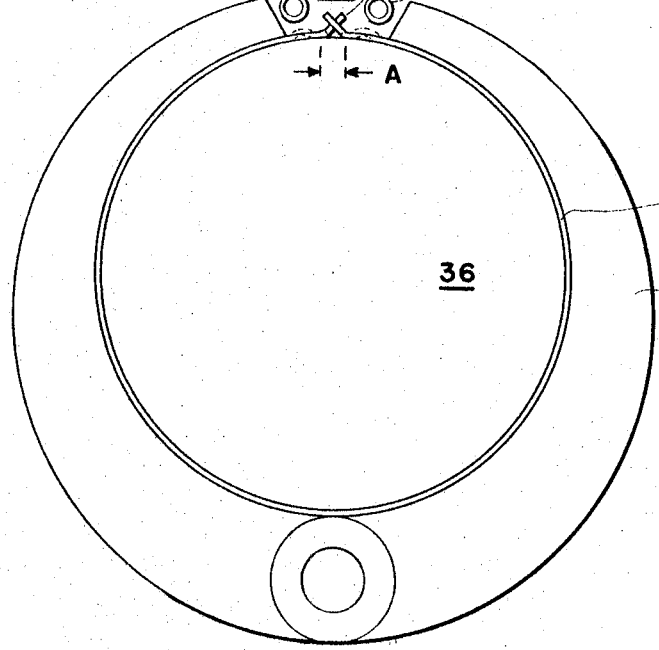

In the drawing:
FIGURE 1 is a plan view of a completed flat joint between two lengths of strip made in accordance with my invention;
FIGURE 2 is a fragmentary side elevation of the prepared and internested end portions of the strip lengths in relation to a pair of welding electrodes during an intermediate step of one embodiment of my method;
FIGURES 3, 4 and 5 are plan views of modified serrations which can be used in the practice of my invention;
FIGURES 6 and 7 are views comparable to FIGURE 2 but illustrating, respectively, the use of an induction heating loop and gas heating means as alternative means for effecting the welding temperature;
FIGURE 8 is a fragmentary illustration of apparatus for carrying out a modified method of the invention in which the edge preparation of the sheet or strip is simplified;
FIGURES 9 and 10 are plan and side elevations, respectively, of other apparatus for advantageously carrying out the method of the invention;
FIGURE 11 is a view comparable to FIGURE 2 but showing modified apparatus for effecting electric resistance heating in the practice of my method; and
FIGURE 12 is a fragmentary end view of a can bodymaker utilizing the principles of my method.

In FIGURES 1 and 2 of the drawing, reference numeral 10 designates one strip length which is to be joined in end-to-end relation to a second strip length 11. In this embodiment the ends of the strip lengths to be joined are die cut, for example, to provide on each length a series of projecting saw teeth 12. The tips and side edges of these teeth will be rather sharp because of the cutting and the exposed metal thereof will be clean and bright. Suitable arrangement is made in the location of the teeth with respect to the side edges of the strip lenghs 10 and 11 that the side edges of the lengths will be precisely aligned, at completion of the joint, as shown in FIGURE 1.

The serrated end portions of the strip lengths 10 and 11 are bent upwardly along transverse lines 13 and 14, respectively, to an extent whereby the indicated angle C is about 135°. As shown in the drawing, the bent lines 13 and 14 are backed off slightly from the roots of the teeth 12 so that the bends take place in solid metal.

The upwardly bent and serrated end portions of the two strip lengths 10 and 11 are next brought into relative position as shown in FIGURE 2 whereby the teeth of the two end portions are interlaced or internested. The bottom sharp corners of the side edges of the teeth contact to limit the movement of the lengths 10 and 11 toward each other. In practice, the serrated end portions are simply jammed against each other thus resulting in a multiplicity of intercontacting projections which facilitates the initiation and progression of the weld. Such weld may be accomplished by a pair of resistance welding electrodes 15 and 16 both of which may be of the rotary type, with electrode 15 having two sections insulated from each other as shown. As is well known to those familiar with the art, a traveling head seam welder having opposed rotary electrodes is provided with means to move one of the electrodes toward and away from the other electrode and to apply welding force between the electrodes. Electrode 16 and one section of electrode 15 are connected to the two output terminals of one welding transformer, while a second transformer has its output terminals connected to electrode 16 and the other section of electrode 15.

In the alternative, the electrode 15 may be simply a double fixed conductive bar which extends along the length of the joint to be made while the electrode 16 is in the form of a conductive roller which rolls along over the work resting on the fixed electrode 15. It is also within the purview of my invention that the electrode 16 may also be a conductive bar carried by means operative to move it toward and away from the fixed electrode 15 and to exert adequate compressive force on the work positioned between the electrodes.

In the embodiments of the invention illustrated in FIGURES 6 and 7, the apparatus comprises an elongated anvil 17 to support the internested serrations of the two workpieces 10 and 11 and such apparatus further includes a finishing or forging tool 18 which may be either a solid bar or a hardened roller. In either case, the function of the tool 18 is to squash down and forge together the serrated edges of the workpieces in the manner accomplished by the electrodes 15 and 16 in the embodiment first described. Of course, this weld forging action takes place only after the serrated edges have been brought to proper welding temperature and to accomplish this latter the apparatus of FIGURE 6 utilizes an induction heating loop or conductors 19 for carrying high frequency current. It should be noted that this loop (or conductors) is closely adjacent to and symmetrical about the serrations so that maximum efficiency is obtained in the heating. The conductors 19, whether part of a single loop or independent, are positioned outside the vertical path of travel of the tool 18, as illustrated. In FIGURE 7, welding heat is supplied by gas jets which issue from burner conduits 20, these conduits being positioned generally in the same locations relative to the other essential components of the apparatus as are the conductors 19 in FIGURE 6.

In the embodiment of FIGURE 8, there is provided an elongated anvil 21 having a centrally disposed flat upper surface 22 and downwardly sloped top side edge portions 23. In the use of this apparatus it is not necessary to bend the edge portions of the workpieces 10S and 11S but, rather, the serrations or teeth 24 of these workpieces are allowed to remain in the respective planes of the flat stock of the workpieces. By loading the workpieces in slopes 23—i.e., the serrations automatically have the desired point contacts. Suitable heating means such as the high frequency inductors 25 is provided to bring the serrations to welding heat and, again, a forging tool 26 is provided to forge the interlocking and heated serrations into a tight weld on the flat surface 22 of anvil 21. The slight bends which remain in the welded stock may be removed by other means, not shown, if such removal is required.

FIGURES 9 and 10 illustrate a slight modificaiton of the apparatus of FIGURE 6 in that I provide upper and lower roller dies 27 and 28, respectively, for engaging the opposite surfaces of the serrated zones of the workpieces 10 and 11. Partially surrounding the die 27 which is on the side of the work having the sharp barbs of the serrations is an induction heating loop 29, and it should be understood that this loop remains fixed with respect to the axis of die 27 during the welding or joining traverse regardless of whether the work is moved or the dies are moved over the work. Die 27 is fabricated of suitable material to withstand the induction heating effect imparted by the high frequency current in the loop 29.

In any of the above alternate welding methods and apparatus a salient and advantageous feature is that initial contact betwen the workpieces takes place at a multiplicity of sharp clean points. This results from the sawtooth nature of the prepared end edges of the workpieces and the geometry of the relative positioning of the end edge portions. The resulting conditions of sharpness, brightness, and increased unit pressure make for ready melting and fusion of the contacting points, and as the angle of the workpiece end portions is progressively reduced the points of interengagement move toward the apices of the teeth causing progressive elongated welds. This extra length increases the strength of the overall joint. Moreover, the action is such that the "zig-zag" or saw-tooth weld line is very narrow whereby the weld is continuous and fluid-tight with a minimum of metal extruded up or down from the principal flat surfaces of the finally flattened stock.

In the embodiments of the invention shown in FIGURES 3, 4 and 5 the workpieces 10 and 11, marked however with single, double, and triple primes, respectively, there is shown various forms which the workpiece end serrations may assume and yet be within the basic principle of the invention. The dovetail arrangement of FIGURE 4 obviously results in a fail-safe arrangement as regards the resistance of the joining strip to separation by tensile forces.

The pitch of the serrations—i.e. number per inch— as well as the depth of the serrations and their initial angular relation may be varied as desired or as found best for different materials and gauges. Also, by varying the distance between the tips of the serrations and the bend lines in the stock more or less material may be made available to forge downwardly in making the weld.

In any of the embodiments herein disclosed the welding or fusion takes place predominately between sheared edge surfaces of the prepared end portions of the strip and not between the normal flat surfaces of the strip. Consequently, the joining method herein disclosed is particularly well adapted for joining aluminized, galvanized, vinyl and other types of coated steel which would be impossible to weld by the usual method, overlapping and welding, and which may be of too thin gauge for joining by the flash-butt method. The present process also avoids the objection of slow productive speed in conventional arc welding methods and the many problems encountered in the joining of coated strip due to contamination caused by the coating materials.

Other advantages of the use of my method reside in the simplification of the apparatus employed to carry out the method and the ease with which such apparatus may be operated and controlled. As stated above, conventional electric resistance seam or press welders may be used, or alternatively, induction welders, gas, or electric arc heaters may be readily adapted to the task by those skilled in the art. The operation of any such equipment carying out the method of my invention is relatively simple principally because once the edges to be joined are properly prepared in the manner herein taught the workpieces may be properly loaded into the welding and/or flattening equipment simply by jamming together the serrated edges in the approximate proper location within the welding throat of the equipment. This automatically pressure-loads the clean interengaging points of the thickness edges of the serrations thereby making for welds of consistently good quality.

Yet another advantageous feature of the method of the invention is that cross alignment of the two strip pieces to be joined automatically results from the natural "lead-in" of the serrations as the pieces are jammed together preparatory to being joined. This inherent indexing eliminates much fixturing in production equipment and results in products of consistently acceptable quality.

FIGURE 11 illustrates a further advantageous use to which the method of the invention may be put. In this device, I provide a pair of elongated parallel anvils 30 and 31 separated by insulation 32 to support the workpieces 10 and 11 in welding position. A first current-conductive rotary electrode 33 overlies anvil 30 and is in contact with workpiece 10. A second rotary electrode 34 contacts workpiece 11, and it will be understood that in actual practice these electrodes 33 and 34 complete a suitable circuit for furnishing resistance heating current which passes through the intercontacting edges of the serrations of the workpieces to bring the metal thereof to welded temperature. Again, a planishing or forging roll or reciprocating die 35 is provided to forge the heated serrations into a continuous fluid-tight weld with the serrations being forced into a common flat plane. The arrangement of FIGURE 11 has the advantage over the resistance arrangement of FIGURE 2 of being more efficient in localizing the heating at the points of contact between the serrations.

FIGURE 12 illustrates a representative but highly advantageous application of the principles of the invention in the making of cylinder can bodies. The sheet or strip stock used may be coated and/or of a metal composition which is ordinarily difficult to dependably weld in a rapid and fluid-tight manner. The apparatus of FIGURE 12 includes a mandrel 36 adapted to have wrapped around it by the bending wings 37 a length of sheet metal 38. This basic apparatus is well known to the canmaking art as a bodymaker and, per se, forms no part of the present invention. In accordance with this invention, however, the stock pieces 38 are each provided with bent and preferably serrated end portions 39 which are adapted to be brought into interlocked relation by the wings 37 as shown in the figure. The apparatus includes suitable means such as the high frequency inductors 40 to heat the intercontacting metal of the ends of the workpiece. It also includes a forging tool 41 which again may be either a rectilinear movable device or a planishing roll to force the heated end portions into a continuously flat weld. Of course, electric resistance heating, gas heating or electric arc heating may be substituted for the induction heating specifically chosen for illustration in FIGURE 11. As explained above, the method of this invention results in a dependable fluid-tight weld even when made in thin and/or coated stock, all of which renders the method well suited for making cylindrical can bodies.

In prior methods and equipment for welding can bodies at the forming station (requiring the use of the mandrel) the body is formed and welded tight and on the mandrel so that the mandrel must be made collapsible to get the completed bodies off. In my method the total volume of material between bend points A as shown in FIGURE 11 is greater than the volume of material which would normally hug the mandrel across these points. Since the tool 41 is brought down forcibly onto the stock or serrations to flatten out the material, the excess material tends either to pucker outside the tool or to spring the wings 37. The resulting increase in the peripheral dimension of the formed and welded body is sufficient to leave the body loose on the mandrel 36 after retraction of the wings 37 and the forging tool 41 sufficient to allow the body to be readily slipped off the mandrel. Thus, the complications of a collapsible mandrel may be avoided.

While I have herein particularly illustrated by improved method as being used for the joining of flat strip workpieces and in the making of can bodies it should be understood that with appropriate dies and fixtures the invention is equally applicable for working in elliptical rectangular, die-contoured, and other irregular shapes. For example, an advantageous use of the invention is in making of automotive muffler body members from aluminum coated steel strip.

Inasmuch as any changes may be made in the details and specific parameters of my invention, some of which are suggested above, without departing from the spirit or scope of the invention reference should be had to the appended claims in determining the scope of the invention.

I claim:

1. The method of joining metal sheet or strip in generally flat edge-to-edge relation which consists of effecting in the edges to be joined a series of deep serrations of such configuration that when said serrated edges are fitted together there results a substantially solid expanse of strip or sheet at and adjacent to the interengaging serrations, bending the edge portions of the workpieces including the serrations and said solid expanse out of the general plane or configuration of the pieces to thereby provide angularly related edge portions of strip or sheet which include said serrations and said solid expanse, thereafter jamming said last mentioned edge portions together at an angle to cause the side edges of the serrations to interlock and interengage at a multiplicity of spaced points, passing welding current through said interengaging points to melt the same and effect fusion therebetween and applying pressure to the interlocked serrations to cause progressive welding along the side edges of the serrations and to bend the first mentioned edge portions of the workpieces back into the initial plane or configuration of the workpieces.

2. The method of claim 1 in which the recited welding current is caused to flow by the application of a pair of electric resistance seam welding electrodes one of which engages the surface of the workpieces at and between the lines of bend of the first mentioned bent edge portions of the workpieces while the other of which has rolling contact along the apices of the said serrations.

3. The method of joining sheet or strip in generally flat edge-to-edge relation which consists of forming the edge portions of the workpieces to be joined with a multiplicity of deep serrations along the proposed jointure line, said serrations being so shaped in plan that when the serrated edges of the workpieces are jammed together and aligned in the original plane or configuration of the workpieces the metal strip is solid at and in the region of the jointure line, thereafter jamming said serrations together in such manner that the serrations on one workpiece are angularly related and interlocked with the serrations on the other workpiece whereby initial contact between the serrations is limited to a multiplicity of discrete points along the sides of said serrations, heating said points to melt the same and cause fusion between the contacting side edges of adjacent serrations, and bending said serrations into a common plane, the effect being such that the fusion progresses from the points of initial contact linearly along the side edges of the adjacent serrations to weld said serrations along their entire lengths.

4. The method of claim 3 including the further step of making said serrations of keystone shape in plan to effect a final dovetail line of weld in the joint to resist opening of the joint by tensile forces applied to the workpieces.

5. The method of making a generally flat edge-to-edge joint between a pair of metal sheet or strip pieces which consists of first serrating the edges of the pieces to be joined in such manner that the serrations of one piece interlock with the serrations of the other piece with a solid expanse of metal at and adjacent to the joint, jamming said serrated edges into angular, contacting interlocking relation, and thereafter forcing said serrations into a common plane while effecting a continuous weld along the zig-zag pattern of the contact between the serrations on one workpiece and the serrations on the other workpiece.

6. The method of making a generally flat edge-to-edge joint between a pair of flat metal workpieces comprising the steps of first serrating the edges of the workpieces to be joined in such manner that the serrations of one edge interlock with the serrations of the other edge to form a solid expanse of metal at and adjacent to the joint, angularly interlocking said serrations while the planes thereof are at an angle whereby the same contact each other at discrete points, heating said serrations whereby welding between the same starts with an proceeds from said points, and forcing said serrations into a common plane to form a continuous "zig-zag" line of weld between said workpieces.

7. The method of claim 6 further characterized in that said heating is accomplished by passing a resistance heating current through contacting portions of said workpieces and across said points and in that said forcing is accomplished by means independent of the circuit for carrying said heating current.

8. The method of claim 6 further characterized in that said heating is accomplished by inducing a high frequency electrical heating current into said serrations.

9. The method of joining the meeting edges of a cylindrically-formed metal sheet assembled on a mandrel which consists of first bending the end portions of the sheet blank out of the general plane of the blank, then applying said blank to the mandrel in such manner that the edge extremities of said portions contact each other while said portions form a tent-like protuberance outwardly of a portion of the mandrel, bringing said contacting edges to welding temperature, and reducing said protuberance down to the general peripheral shape of the mandrel so that the circumferential dimension of the inner surface of the welded sheet increases beyond the circumferential dimension of the outer surface of the mandrel to allow the welded cylindrical body to be slid off said mandrel axially.

10. The method of claim 9 including the further step of serrating said edges prior to application of the blank to said mandrel whereby the serrations on opposite end portions of said blank will angularly interlock with each other and have points of interengagement to initiate the melting required for welding.

References Cited by the Examiner

UNITED STATES PATENTS

| | | | |
|---|---|---|---|
| 1,712,507 | 5/1929 | Lawson | 219—101 |
| 1,773,068 | 8/1930 | Vienneau | 219—105 |
| 2,619,574 | 11/1952 | Lambert | 219—105 |
| 2,730,601 | 1/1956 | Reed | 219—101 |
| 2,800,561 | 7/1957 | Shenk | 219—8.5 |

RICHARD M. WOOD, *Primary Examiner.*

B. STEIN, *Assistant Examiner.*